(12) United States Patent
Wienkes

(10) Patent No.: US 11,912,419 B2
(45) Date of Patent: Feb. 27, 2024

(54) ICE PROTECTION MODULATION WITH ATMOSPHERIC CONDITIONS

(71) Applicant: Honeywell International Inc., Charlotte, NC (US)

(72) Inventor: Lee R. Wienkes, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 71 days.

(21) Appl. No.: 17/581,675

(22) Filed: Jan. 21, 2022

(65) Prior Publication Data

US 2023/0234713 A1 Jul. 27, 2023

(51) Int. Cl.
*B64D 15/22* (2006.01)

(52) U.S. Cl.
CPC .................. *B64D 15/22* (2013.01)

(58) Field of Classification Search
CPC ......... B64D 15/12; B64D 15/20; B64D 15/22
See application file for complete search history.

(56) References Cited

U.S. PATENT DOCUMENTS

| | | | |
|---|---|---|---|
| 4,039,809 A * | 8/1977 | Bailey | G01N 23/09 250/390.05 |
| 4,646,068 A * | 2/1987 | Skala | G01N 23/204 250/390.05 |
| 6,609,825 B2 * | 8/2003 | Ice | G01K 13/02 374/138 |
| 6,868,721 B2 | 3/2005 | Szilder | |
| 8,843,253 B1 | 9/2014 | Chapman | |
| 9,222,873 B2 * | 12/2015 | Baumgardner | G01S 17/95 |
| 9,242,735 B1 | 1/2016 | Meis et al. | |
| 10,093,426 B2 | 10/2018 | LoPresto | |
| 10,232,949 B2 | 3/2019 | English et al. | |
| 10,336,465 B2 * | 7/2019 | Rennó | B64D 15/22 |
| 10,591,422 B2 * | 3/2020 | Fan | G01N 15/06 |

(Continued)

FOREIGN PATENT DOCUMENTS

| | | |
|---|---|---|
| EP | 2202151 B1 | 9/2016 |
| EP | 3677509 A1 | 7/2020 |

(Continued)

OTHER PUBLICATIONS

Boudala, Faisal et al., "Aircraft Icing Study Using Integrated Observations and Model Data", Weather and Forecasting, Jun. 2019, pp. 1 through 23, vol. 34, Published: US.

(Continued)

*Primary Examiner* — Philip J Bonzell
*Assistant Examiner* — Michael B. Kreiner
(74) *Attorney, Agent, or Firm* — Fogg & Powers LLC

(57) ABSTRACT

Improvements to ice protection systems as disclosed herein include monitoring ice accretion intensity based on atmospheric conditions proximate to a vehicle. Examples of parameters that measure atmospheric conditions include a water content and a size distribution of an atmosphere around a vehicle. These parameters, along with other vehicle parameters, are used to control at least one ice protection element to reduce ice accretion intensity at one or more designated locations of the vehicle. Incorporating measurements of cloud conditions enables nuanced control of the ice protection system and improves overall system efficiency of the vehicle.

20 Claims, 4 Drawing Sheets

(56) References Cited

U.S. PATENT DOCUMENTS

| | | | |
|---|---|---|---|
| 10,611,488 B2* | 4/2020 | LoPresto | B64D 47/02 |
| 10,625,869 B2* | 4/2020 | LoPresto | B64D 15/20 |
| 10,725,173 B2* | 7/2020 | Ray | G01S 7/499 |
| 10,794,835 B2* | 10/2020 | Fan | B64D 15/20 |
| 10,816,661 B2* | 10/2020 | Ray | G01S 7/025 |
| 2004/0024538 A1 | 2/2004 | Severson et al. | |
| 2008/0167764 A1 | 7/2008 | Flemming | |
| 2009/0321576 A1 | 12/2009 | Shah et al. | |
| 2011/0226904 A1 | 9/2011 | Flemming | |
| 2011/0253841 A1 | 10/2011 | Kozlow et al. | |
| 2013/0240672 A1 | 9/2013 | Meis | |
| 2013/0284856 A1 | 10/2013 | Botura et al. | |
| 2014/0263260 A1 | 9/2014 | Duncan et al. | |
| 2016/0009400 A1 | 1/2016 | English et al. | |
| 2017/0313429 A1 | 11/2017 | Jackson | |
| 2017/0369176 A1 | 12/2017 | LoPresto | |
| 2018/0086471 A1 | 3/2018 | Wollenweber | |
| 2019/0039742 A1 | 2/2019 | Gordon et al. | |
| 2019/0079021 A1* | 3/2019 | Fan | G03B 21/625 |
| 2019/0107496 A1* | 4/2019 | Fan | G01N 15/0211 |
| 2019/0324051 A1* | 10/2019 | Wienkes | G01F 1/7086 |

FOREIGN PATENT DOCUMENTS

| | | | | |
|---|---|---|---|---|
| GB | 2511344 A | * | 9/2014 | B64D 15/20 |
| GB | 2511344 A | | 9/2014 | |

OTHER PUBLICATIONS

Mason, et al., "The Ice Particle Threat To Engines In Flight", 44th AIAA Aerospace Sciences Meeting Exhibit, Jan. 9-12, 2006, Reno, NV, pp. 1 through 25, Published: US.

Matheis et al., "Four Years of Testing to AS5562", SAE Technical Paper 2019-01-1957, SAE International, Jun. 10, 2019, 2019-01-1957, pp. 1 through 13, Published: US.

Politovich, M K, "Aircraft Icing", Elsevier Science Ltd., 2003, pp. 1 through 8, Published: US.

Alekseenko et al., "Mathematical Modeling of Ice Body formation on the Wing Airfoil Surface", Fluid Dynamics, 2014, vol. 49, No. 6, pp. 715 through 732, Pleiades Publishing Ltd.

European Patent Office, "Extended European Search Report", from EP Application No. 23150240.2, from Foreign Counterpart to U.S. Appl. No. 17/581,675, dated May 19, 2023, pp. 1 through 10, Published: EP.

* cited by examiner

ICE PROTECTION MODULATION WITH ATMOSPHERIC CONDITIONS

BACKGROUND

Aerial vehicles traverse through atmospheric conditions that may cause moisture in the environment to condense and freeze on the aerial vehicle. For aircraft, the wings are particularly susceptible to ice accretion. Left unchecked, ice accretion can lead to dangerous flight conditions and severe risk to life and property on the aerial vehicle.

Most modern aircraft utilize ice protection systems that require manual activation based on either visual cues or a dedicated icing sensor. These ice protection systems come in a wide variety of ice control schemes (e.g., electrothermal, bleed air, pneumatic). A problem with these systems is that icing sensors provide insufficient data to understand the scope of the danger caused by potential icing conditions.

Therefore, a need exists to improve ice protection systems when traversing through inclement environmental conditions.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, an ice protection system is disclosed. The ice protection system comprises at least one particle sensor configured to measure at least one atmospheric particle parameter. The at least one atmospheric particle parameter includes a size distribution and water content of a cloud. The ice protection system further comprises at least one additional sensor configured to measure at least one vehicle parameter of a vehicle. The ice protection system further comprises at least one processor coupled to the at least one particle sensor and the at least one additional sensor. The at least one processor is configured to receive the at least one atmospheric particle parameter and the at least one vehicle parameter. The at least one processor is further configured to determine an intensity of ice accretion corresponding to at least one designated location of the vehicle based on the at least one atmospheric particle parameter and the at least one vehicle parameter. The ice protection system further comprises at least one ice protection element coupled to the at least one processor. Each of the at least one ice protection element is configured to reduce ice accretion in a respective designated location of the vehicle. The at least one processor is configured to control the at least one ice protection element based on the intensity of ice accretion corresponding to the at least one designated location.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as further described in the detailed description.

Figure 1:
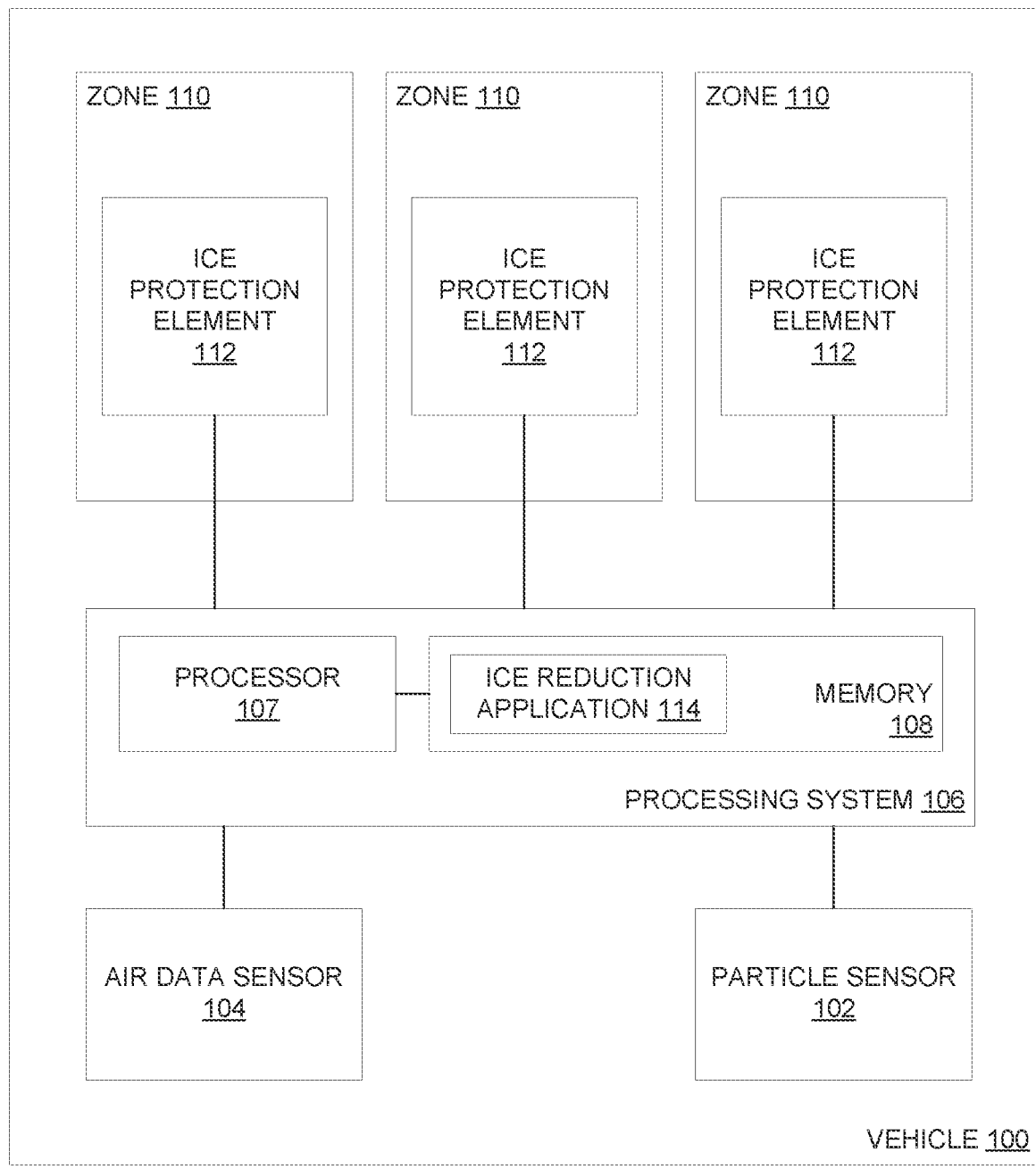
FIG. 1 depicts a block diagram illustrating one embodiment of an exemplary ice protection system configured to reduce ice accretion on a vehicle.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The present disclosure presents improvements to ice protection systems on vehicles that navigate through environmental conditions that pose a risk of ice accretion on a surface of the vehicle. Exemplary embodiments of the present disclosure include consideration of cloud conditions in monitoring ice accretion when traversing through inclement environments. Incorporating measurements of cloud conditions allow for more nuanced control of the ice protection system, thus saving power and fuel costs while maintaining safety margins. Accordingly, incorporating the ice protection techniques of the present disclosure can improve ice detection and system efficiency when navigating through these inclement environments.

FIG. 1 depicts a block diagram illustrating an exemplary ice protection system configured to reduce ice accretion on a vehicle 100. In exemplary embodiments, the vehicle 100 is an aerial traversing vehicle, including but not limited to: a commercial, non-commercial, or recreational aircraft. Additionally, the vehicle 100 can be an urban air mobility (UAM) vehicle, advanced air mobility (AAM) vehicle, unmanned vehicle, or any other type of aerial traversing vehicle. However, use of the term "vehicle" is not intended to be limiting and includes all classes of vehicles falling within the ordinary meaning of the term. This would also include but not limited to, water traversing vehicles and land traversing vehicles. Throughout the disclosure, the vehicle may be further illustrated as an aircraft with the understanding that the principles described herein apply to other vehicles where applicable.

When vehicle 100 is an aerial vehicle, both cloud conditions and parameters relevant to the vehicle (e.g., speed, orientation, etc.) are used to determine and modulate ice accretion on the vehicle. Other parameters relevant to ice accretion risk can also be used. For example, when vehicle 100 is a land or water traversing vehicle, other parameters indicative of ice accretion risk forming on the vehicle or a portion thereof can be used.

The ice protection system includes at least one ice protection element 112 configured to reduce ice accretion for at least one designated zone 110 of the vehicle 100. Each zone 110 is a part of the vehicle 100 in which ice protection is desired. For example, as described further in FIG. 2, zones 110 can include leading edges of an aircraft wing. However, zones 110 can additionally or alternatively include other locations of the vehicle 100, such as probes or sensors that reside on the surface of the vehicle 100, the nacelle around an engine or other parts of the airframe, or any surface or location of the vehicle that could accrete ice. And although three zones 110 are explicitly shown in FIG. 1, any number of zones 110 can be utilized. In this way, the ice protection system can monitor selected areas of the vehicle 100 so that important and/or sensitive equipment on the vehicle can function within their respective operating parameters as well as maintaining suitable navigation conditions.

Each ice protection element 112 includes appropriate circuitry that reduces ice accretion for the respective zone 110. Ice reduction techniques can include thermal, electrothermal, mechanical, pneumatic, bleed air, along with other techniques or a combination thereof. While FIG. 1 pedagogically depicts a single ice protection element 112 for each zone 110, a zone 110 can include any number of ice protection elements 112. Also, an ice protection element 112 in a zone 110 may function differently than another ice protection element 112 located in the same zone 110 or at a different zone 110.

Coupled to each zone 110 is a processing system 106. Processing system 106 includes at least one processor 107 coupled to a memory 108, and is configured to control each ice protection element 112. Processing system 106 and/or processor 107 may include any one or combination of processors, microprocessors, digital signal processors, application specific integrated circuits, field programmable gate arrays, and/or other similar variants thereof. Processing system 106 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Memory 108 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. Memory 108 may also include one or more databases to store acquired data. In an embodiment, memory 108 stores an ice reduction application 114 that includes instructions for performing an ice reduction technique when executed by at least one of the processors 107. One exemplary method is described in connection with FIG. 3 below.

In an embodiment, processing system 106 controls each ice protection element 112 via control signals transmitted by processor 107 that activates, deactivates, or adjusts the operation of the ice protection element 112. For a thermal ice reduction example, processing system 106 causes the ice protection element 112 to provide heat to zone 110, thereby causing any ice formed on the respective zone 110 to melt into liquid water or evaporate into water vapor.

Also coupled to processing system 106 is particle sensor 102, which is configured to measure at least one atmospheric particle parameter. As used herein, an "atmospheric particle parameter" is a characteristic of the atmospheric particles surrounding the vehicle. The at least one atmospheric particle parameter includes a size distribution and water content of a cloud. The size distribution is a parameter describing how the mass of water or ice is distributed between droplets of different sizes in the atmosphere. The water content is a parameter of the mass concentration of water in the atmosphere—this parameter can come in three forms: (1) liquid water content, which measures only the water in the liquid phase, (2) solid water content, which measures only the water in the solid (e.g., ice) phase, or (3) total water content, which measures the sum of both the liquid and solid water. In some embodiments (e.g., when implemented on a leading edge of an aerial vehicle), the liquid water content is most relevant for airframe icing, while in other embodiments the ice water content is important for icing of already heated surface (e.g., an engine of a vehicle). In some embodiments, both types of water content are considered (e.g., for sensors such as pitot tubes). Also, the size distribution optionally corresponds to the water content so that when liquid water content is measured, the size distribution of water droplets is used with the liquid water content when monitoring ice accretion on a vehicle. Likewise, when ice water content is measured, the size distribution of ice droplets is used with the ice water content (which may further be combined into an icing model with liquid water content and corresponding size distribution measurements).

In an embodiment, particle sensor 102 is configured to measure at least one atmospheric particle parameter at a selected measurement region of the vehicle, such as a region closely proximate to one or more zones 110. More than one particle sensor 102 can be used to measure atmospheric particle parameters in different locations of the vehicle. Particle sensor 102 then transmits the at least one atmospheric particle parameter to the processing system 106 for further analysis and ice accretion reduction.

Air data sensor 104 is coupled to processing system 106 and is configured to measure at least one air data parameter. As used herein, an "air data parameter" is a characteristic of the vehicle during navigation, such as the angle-of-attack, angle-of-sideslip, airspeed, altitude, and the like. The air data sensor 104 provides the air data to the processing system 106 for further analysis and ice accretion reduction. In an embodiment, the air data sensor 104 and/or the particle sensor 102 is implemented by a light detection and ranging (lidar) system or other optical sensor. Other examples of air data sensor 104 include at least one of: pitot tube(s), total air temperature (TAT) probe(s), or angle of attach (AoA) sensor(s). As with particle sensor 102, air data sensor 104 can be configured to measure air data parameters at a selected measurement region of the vehicle, and more than one air data sensor 104 can be used to measure air data parameters in different locations of the vehicle. While FIG. 1 depicts an air data sensor 104 configured to measure air data parameters, in embodiments with land or water traversing vehicles, other sensors are used to determine other vehicle parameters of the vehicle, such as speed, orientation, or other motion or non-motion parameters relevant to ice accretion on the vehicle or a portion thereof. In one embodiment, the vehicle parameters include the air data parameters described above. Therefore, air data sensor 104 and air data parameters are and will be pedagogically depicted and illustrated as an exemplary embodiment.

Processing system 106 analyzes the air data parameters received from air data sensor 104 and the atmospheric particle parameters received from particle sensor 102 to control the ice protection elements 112. In some embodiments, the processing system 106 uses an icing model to predict the degree of ice accretion as a function of the position of the vehicle 100 and generates an output of the intensity of ice accretion at one or more of the zones 110. The icing model can include a reduced order model and/or data stored in a look-up table stored in memory 108 to determine whether conditions warrant activating one or more ice protection elements 112, and in some embodiments, the degree of ice reduction to the respective zone 110. The icing model input includes any one of or combination of liquid water content, liquid water size distribution, solid water content, solid water crystal size distribution, and total water content (liquid water and solid water). Additionally, or alternatively, the icing model considers data from empirical sources (e.g., an icing wind tunnel or flight test), a computational fluid dynamics (CFD) model, or a combination thereof. The icing model in some embodiments is implemented via machine learning techniques, including one or more artificial neural networks (ANN). Such techniques can include but not limited to deep neural networks (DNN), recurrent neural networks (RNN), and the like.

Based on the icing model and the input air data and atmospheric particle parameters, processing system 106 provides dynamic control of the ice protection elements 112 to reduce ice accretion in each zone 110. When the output of the icing model indicates that the intensity of ice accretion at one or more of the zones 110 is sufficiently high, processing system 106 then configures the corresponding ice protection element(s) 112 to reduce the ice accretion formed at the respective zones 110. The inputs of the icing model may vary depending on the zone(s) 110 that are monitored. As previously described, an input that corresponds to a zone covering a pitot tube may consider both distribution of water droplets or ice crystals in the proximate environment, while in other zones, only water droplet distribution is considered (along with water content and other optional parameters). The inputs (and any weighting of inputs) may also vary based on the type of vehicle. For example, the input parameters or weighting of such parameters may differ when implemented on a large commercial aircraft as opposed to a small UAM or even land-based vehicle.

Figure 2:
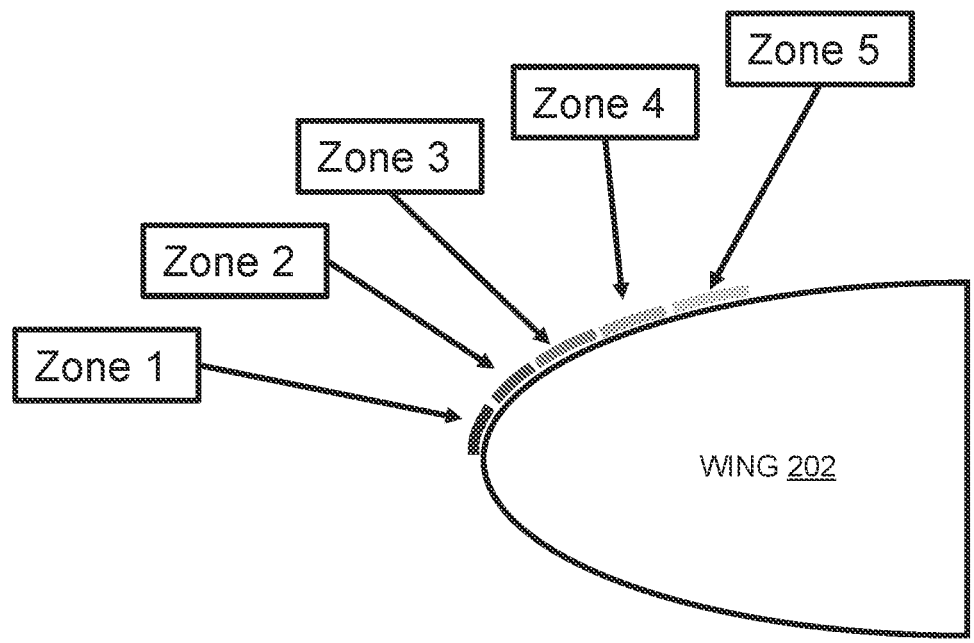
FIG. 2 depicts a diagram illustrating one embodiment of an ice protection control on multiple zones of a vehicle.

FIG. 2 depicts a diagram illustrating ice protection control on multiple zones of a vehicle. As shown in FIG. 2, five zones on wing 202 of an aerial vehicle are monitored by an ice protection system. Each zone includes at least one ice protection element coupled to a surface of the respective zone. The ice protection system includes a processing system such as that described in FIG. 1 to control the ice protection elements in each zone based on data acquired from the size distribution and water content of droplets in the environment surrounding each zone.

In general, the concentration of ice accretion increases from Zone 1 to Zone 5 along wing 202 as the droplet size of the cloud increases because of the increasing ballistic nature of the droplets along with the higher resistance to freezing for larger sized droplets. Therefore, for larger droplet sizes, Zone 5 would be most likely to be activated or controlled while Zone 1 would be least likely to be activated or controlled. Conversely, for smaller droplet sizes, Zone 1 would be most likely to be activated or controlled. As previously described, size distribution is but one parameter considered by the ice protection system, and along with the water content and air data parameters, the ice protection system can dynamically control each ice protection element in each zone to reduce ice accretion.

In many implementations, such as surfaces with exposed contact with water droplets in the environment, monitoring the size distribution primarily concerns size distributions of water droplets that contact with the surface and may accrete into ice crystals. One example of such a surface is a leading edge of an aircraft wing. However, in other implementations, it is advantageous to consider size distribution of water droplets and/or ice crystals in a designated location of the vehicle. For instance, aircraft are typically equipped with one or more pitot tubes for measuring various air data parameters, and these sensors are vulnerable to ice accretion since they analyze airflow proximate to the aircraft. However, applying conventional ice protection to pitot tubes can risk introducing ice crystals that formulate in the body of the pitot tube from water in the environment entering the pitot tube. Accordingly, in some embodiments, size distribution of ice crystals with or without water droplets is used to monitor and control ice accretion in designated locations of the vehicle.

Figure 3:
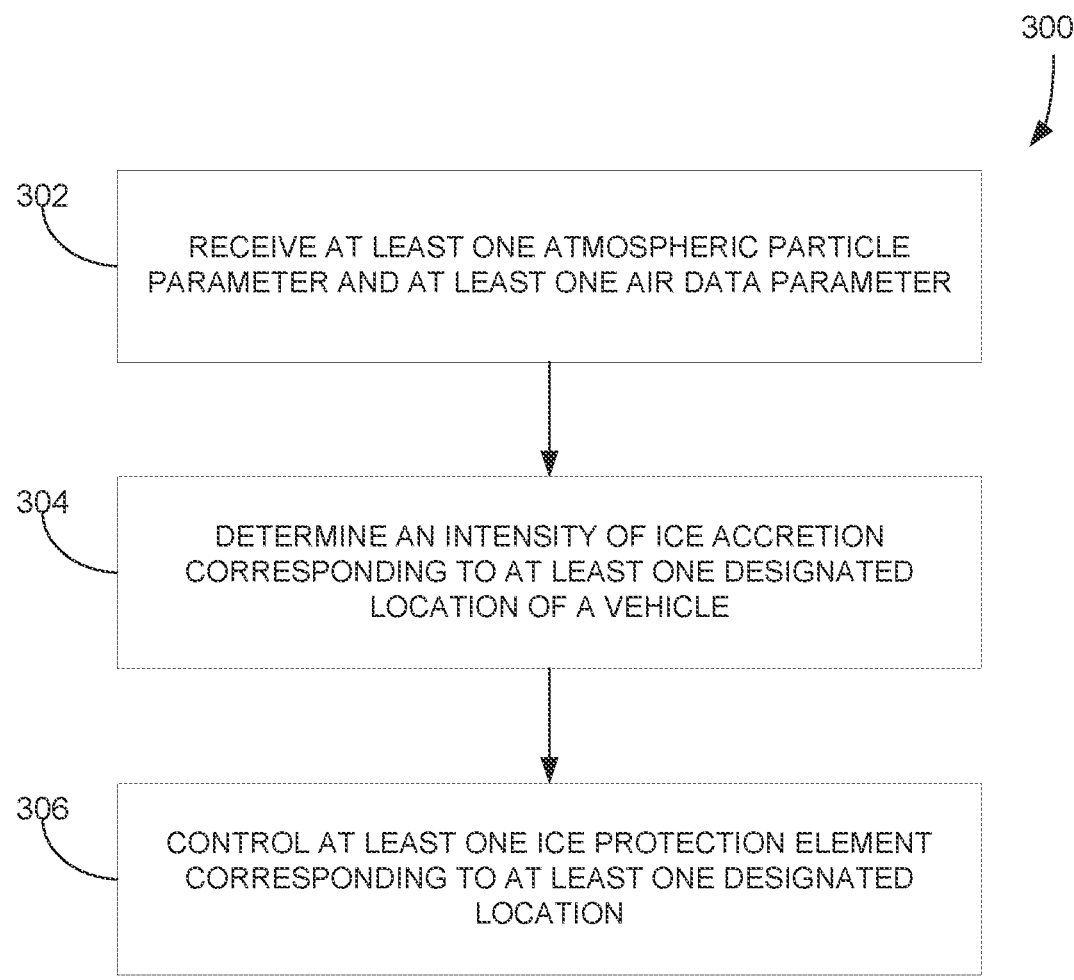
FIG. 3 depicts a flow diagram illustrating one embodiment of a method for reducing ice accretion on a vehicle.

FIG. 3 depicts a flow diagram illustrating a method for reducing ice accretion on a vehicle. Method 300 may be implemented via the techniques described with respect to FIGS. 1-2, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). In an embodiment, method 300 is performed as part of the ice reduction application 114 stored in memory 108 and executed by processor 107.

Beginning at block 302, method 300 receives at least one atmospheric particle parameter and at least one air data parameter. The at least one atmospheric particle parameter includes a size distribution and water content of a cloud. Method 300 proceeds to block 304 by determining an intensity of ice accretion corresponding to at least one designated location of the vehicle. In some embodiments, the at least one atmospheric particle parameter data and air data parameter data are input into an icing model that outputs an ice intensity for each respective zone of the vehicle. The icing model in some embodiments is implemented via machine learning techniques, including one or more artificial neural networks (ANN). Such techniques can include but not limited to deep neural networks (DNN), recurrent neural networks (RNN), and the like.

Method 300 then proceeds to block 306 to control at least one ice protection element corresponding to the at least one designated location of the vehicle. In some embodiments, controlling the ice protection elements includes activating or deactivating one or more ice protection elements when the output ice accretion intensity exceeds a threshold value. As an example, when the output ice accretion intensity for one or more zones exceeds a first threshold value, the corresponding ice protection elements are activated for those zones. Conversely, when the output ice accretion intensity for one or more zones falls below a second threshold value, then minimal ice accretion has formed on those zones and the corresponding ice protection elements are deactivated to conserve power. For more dynamic control, controlling the ice protection elements includes modulating a power level of one or more ice protection elements based on the level of output ice accretion intensity. For example, the ice protection element can be set to a percentage of the maximum power level for the ice protection element based on the ice accretion intensity.

Figure 4:
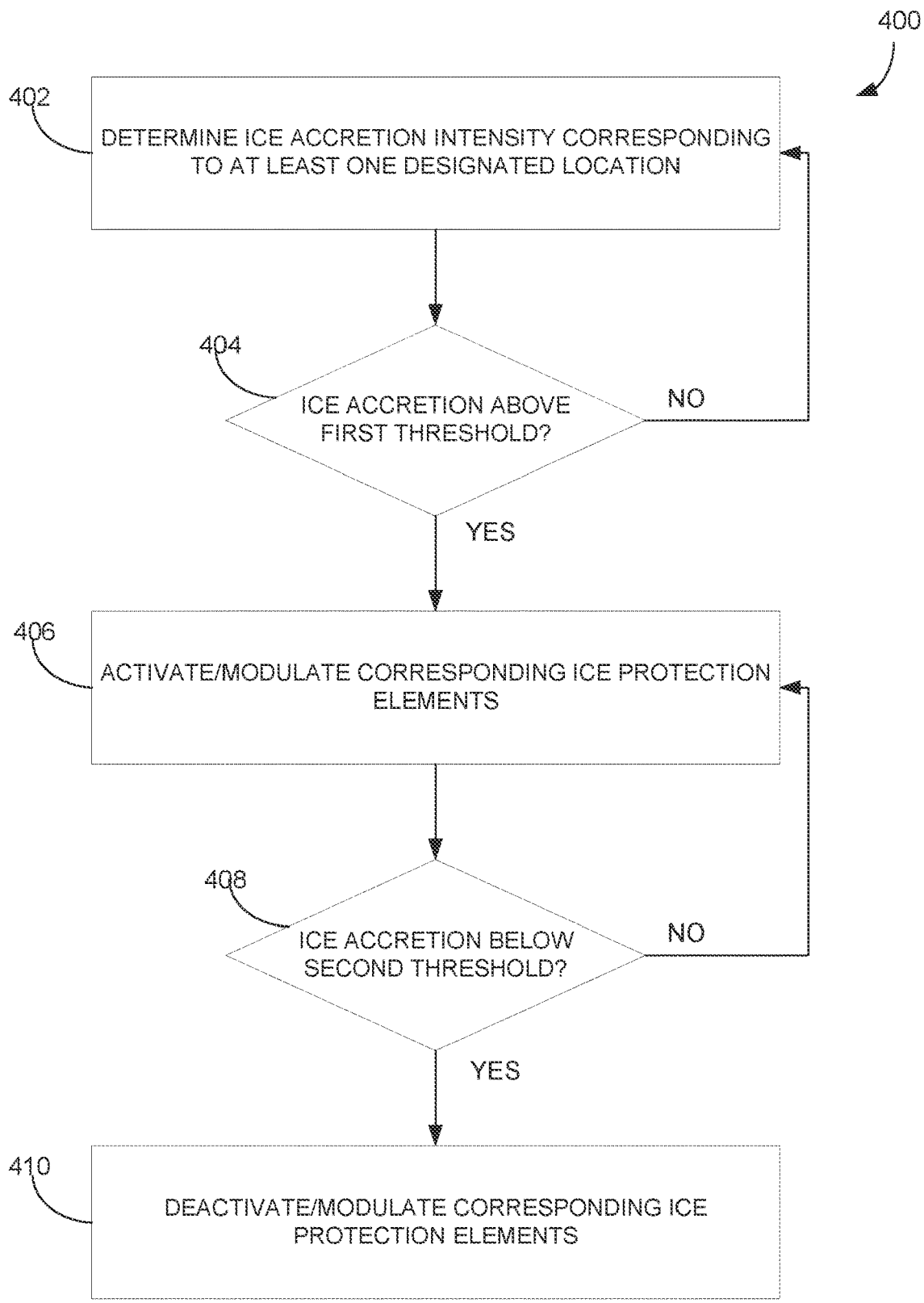
FIG. 4 depicts a flow diagram illustrating one embodiment of a method for controlling ice protection elements on a vehicle.

FIG. 4 depicts a flow diagram illustrating one embodiment of a method for controlling ice protection elements on a vehicle. Method 400 can be implemented via the techniques described with respect to FIGS. 1-3, but may be implemented in other ways as well. In one embodiment, method 400 is performed in conjunction with block 306 of method 300 or ice reduction application 114.

Beginning at block 402, method 400 determines ice accretion intensity(ies) corresponding to at least one designated location of a vehicle. At block 404, method 400 determines whether the determined ice accretion intensit(ies) exceed a first threshold. If the ice accretion intensit(ies) do not exceed the first threshold, method 400 reverts to block 402 to determine a different set of ice accretion intensit(ies). If the ice accretion intensit(ies) exceed the first threshold, then method 400 proceeds to block 406 to configure ice protection elements of an ice protection system to reduce ice accretion at the designated locations that exceed the first threshold. In an embodiment, method 400 activates the corresponding ice protection elements. Additionally, or alternatively, method 400 modulates a power level of the corresponding ice protection elements based on the intensity of ice accretion for each respective designated location.

Proceeding to block 408, method 400 determines whether the ice accretion intensit(ies) are below a second threshold. If not, then method 400 reverts to block 406 and continues to configure the ice protection elements to reduce ice accretion in the corresponding designated locations. In an embodiment, the second threshold is less than the first threshold, or alternatively, the two thresholds can be equal. If the ice accretion intensit(ies) exceed the second threshold, then method 400 proceeds to block 410 and configures the corresponding ice protection elements to provide less ice protection at the corresponding designated zones. In an embodiment, the ice protection elements can be deactivated, or can be modulated to reduce the power of the ice protection elements.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read only memory (EPROM), electrically erasable programmable read only memory (EE-PROM), and flash memory devices; magnetic disks such as internal hard disks and removable disks; magneto-optical disks; and digital video disks (DVDs). Any of the foregoing may be supplemented by, or incorporated in, specially-designed application specific integrated circuits (ASICs).

Example Embodiments

Example 1 includes an ice protection system, comprising: at least one particle sensor configured to measure at least one atmospheric particle parameter, the at least one atmospheric particle parameter including a size distribution and water content of an atmosphere around a vehicle; at least one additional sensor configured to measure at least one vehicle parameter; at least one processor coupled to the at least one particle sensor and the at least one additional sensor, wherein the at least one processor is configured to: receive the at least one atmospheric particle parameter and the at least one vehicle parameter; determine an intensity of ice accretion corresponding to at least one designated location of the vehicle based on the at least one atmospheric particle parameter and the at least one vehicle parameter; and at least one ice protection element coupled to the at least one processor, wherein each of the at least one ice protection element is configured to reduce ice accretion in a respective designated location of the vehicle, wherein the at least one processor is configured to control the at least one ice protection element based on the intensity of ice accretion corresponding to the at least one designated location.

Example 2 includes the ice protection system of Example 1, wherein the at least one designated location of the vehicle includes a leading edge of a wing.

Example 3 includes the ice protection system of any of Examples 1-2, wherein the at least one processor is configured to input the at least one vehicle parameter and the at least one atmospheric particle parameter into a model, and wherein the model is configured to generate an output including the intensity of ice accretion.

Example 4 includes the ice protection system of any of Examples 1-3, wherein the water content includes at least one of: liquid water content or solid water content.

Example 5 includes the ice protection system of any of Examples 1-4, wherein to control the at least one ice protection element comprises activating the at least one ice protection element when the intensity of ice accretion exceeds a first threshold, and deactivating the at least one ice protection element when the intensity of ice accretion is below a second threshold.

Example 6 includes the ice protection system of any of Examples 1-5, wherein to control the at least one ice protection element comprises modulating a power level of the at least one ice protection element based on the intensity of ice accretion.

Example 7 includes the ice protection system of any of Examples 1-6, wherein the size distribution includes at least one of: size distribution of liquid water droplets or size distribution of solid water crystals.

Example 8 includes a method, comprising: receiving at least one atmospheric particle parameter and at least one vehicle parameter, the at least one atmospheric particle parameter including a size distribution and water content of an atmosphere around a vehicle; determining an intensity of ice accretion corresponding to at least one designated location of the vehicle based on the at least one atmospheric particle parameter and the at least one vehicle parameter; and controlling at least one ice protection element corresponding to the at least one designated location based on the intensity of ice accretion, the at least one ice protection element configured to reduce ice accretion.

Example 9 includes the method of Example 8, wherein receiving at least one vehicle parameter comprises receiving at least one air data parameter, the at least one air data parameter comprising at least one of angle-of-attack, angle-of-sideslip, airspeed, or altitude.

Example 10 includes the method of any of Examples 8-9, wherein determining an intensity of ice accretion comprises generating an output from at least one of a reduced order model, a look-up table, or a computational fluid dynamics model based on an input including the at least one atmospheric particle parameter and the at least one vehicle parameter.

Example 11 includes the method of any of Examples 8-10, wherein controlling the at least one ice protection element comprises activating the at least one ice protection element when the intensity of ice accretion exceeds a first threshold, and deactivating the at least one ice protection element when the intensity of ice accretion is below a second threshold.

Example 12 includes the method of any of Examples 8-11, wherein controlling the at least one ice protection element comprises modulating a power level of the at least one ice protection element based on the intensity of ice accretion.

Example 13 includes the method of any of Examples 8-12, wherein determining an intensity of ice accretion comprises generating an output based on empirical data input including data acquired from an icing wind tunnel or a test flight.

Example 14 includes the method of any of Examples 8-13, wherein determining an intensity of ice accretion comprises determining an intensity of ice accretion of a leading edge of a wing.

Example 15 includes a program product comprising a non-transitory computer readable medium having instructions stored thereon, that when executed by at least one processor, causes the at least one processor to: receive at least one atmospheric particle parameter and at least one vehicle parameter, the at least one atmospheric particle parameter including a size distribution and water content of an atmosphere around a vehicle; determine an intensity of ice accretion corresponding to at least one designated location of the vehicle based on the at least one atmospheric particle parameter and the at least one vehicle parameter; and control at least one ice protection element corresponding to the at least one designated location based on the intensity of ice accretion, the at least one ice protection element configured to reduce ice accretion.

Example 16 includes the program product of Example 15, wherein to determine an intensity of ice accretion comprises to generate an output from a model including the intensity of ice accretion based on an input including the at least one atmospheric particle parameter and the at least one vehicle parameter.

Example 17 includes the program product of any of Examples 15-16, wherein to determine an intensity of ice accretion comprises to generate an output from at least one of a reduced order model, a look-up table, or a computational fluid dynamics model based on an input including the at least one atmospheric particle parameter and the at least one vehicle parameter.

Example 18 includes the program product of any of Examples 15-17, wherein to control the at least one ice protection element comprises to activate the at least one ice protection element when the intensity of ice accretion exceeds a first threshold, and to deactivate the at least one ice protection element when the intensity of ice accretion is below a second threshold.

Example 19 includes the program product of any of Examples 15-18, wherein to control the at least one ice protection element comprises to modulate a power level of the at least one ice protection element based on the intensity of ice accretion.

Example 20 includes the program product of any of Examples 15-19, wherein to determine an intensity of ice accretion comprises to generate an output based on empirical data input including data acquired from an icing wind tunnel or a test flight.

The terms "about" or "substantially" mean that the value or parameter specified may be somewhat altered, as long as the alteration does not result in nonconformance of the process or structure to the illustrated embodiment from the perspective of one having ordinary skill in the art. The term "exemplary" merely indicates the accompanying description is used as an example, rather than implying an ideal, essential, or preferable feature of the invention.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An ice protection system, comprising:
    at least one particle sensor configured to measure a plurality of atmospheric particle parameters, the plurality of atmospheric particle parameters including a size distribution and water content of an atmosphere around a vehicle, wherein the size distribution includes a size distribution of water particles in a solid form and a liquid form;
    at least one additional sensor configured to measure at least one vehicle parameter;
    at least one processor coupled to the at least one particle sensor and the at least one additional sensor, wherein the at least one processor is configured to:
    receive the plurality of atmospheric particle parameters and the at least one vehicle parameter;
    determine an intensity of ice accretion corresponding to at least one designated location of the vehicle based on the plurality of atmospheric particle parameters and the at least one vehicle parameter; and
    at least one ice protection element coupled to the at least one processor, wherein each of the at least one ice protection element is configured to reduce ice accretion in a respective designated location of the vehicle,
    wherein the at least one processor is configured to control the at least one ice protection element based on the intensity of ice accretion corresponding to the at least one designated location.

2. The ice protection system of claim 1, wherein the at least one designated location of the vehicle includes a leading edge of a wing.

3. The ice protection system of claim 1, wherein the at least one processor is configured to input the at least one vehicle parameter and the plurality of atmospheric particle parameters into a model, and wherein the model is configured to generate an output including the intensity of ice accretion.

4. The ice protection system of claim 1, wherein the water content includes at least one of: liquid water content or solid water content.

5. The ice protection system of claim 1, wherein to control the at least one ice protection element comprises activating the at least one ice protection element when the intensity of ice accretion exceeds a first threshold, and deactivating the at least one ice protection element when the intensity of ice accretion is below a second threshold.

6. The ice protection system of claim 1, wherein to control the at least one ice protection element comprises modulating a power level of the at least one ice protection element based on the intensity of ice accretion.

7. The ice protection system of claim 1, wherein the size distribution includes both a size distribution of liquid water droplets and a size distribution of solid water crystals.

8. A method, comprising:
receiving a plurality of atmospheric particle parameters and at least one vehicle parameter, the plurality of atmospheric particle parameters including a size distribution and water content of an atmosphere around a vehicle, wherein the size distribution includes a size distribution of water particles in a solid form and a liquid form;
determining an intensity of ice accretion corresponding to at least one designated location of the vehicle based on the plurality of atmospheric particle parameters and the at least one vehicle parameter; and
controlling at least one ice protection element corresponding to the at least one designated location based on the intensity of ice accretion, the at least one ice protection element configured to reduce ice accretion.

9. The method of claim 8, wherein receiving at least one vehicle parameter comprises receiving at least one air data parameter, the at least one air data parameter comprising at least one of angle-of-attack, angle-of-sideslip, airspeed, or altitude.

10. The method of claim 8, wherein determining an intensity of ice accretion comprises generating an output from at least one of a reduced order model, a look-up table, or a computational fluid dynamics model based on an input including the plurality of atmospheric particle parameters and the at least one vehicle parameter.

11. The method of claim 8, wherein controlling the at least one ice protection element comprises activating the at least one ice protection element when the intensity of ice accretion exceeds a first threshold, and deactivating the at least one ice protection element when the intensity of ice accretion is below a second threshold.

12. The method of claim 8, wherein controlling the at least one ice protection element comprises modulating a power level of the at least one ice protection element based on the intensity of ice accretion.

13. The method of claim 8, wherein determining an intensity of ice accretion comprises generating an output based on empirical data input including data acquired from an icing wind tunnel or a test flight.

14. The method of claim 8, wherein determining an intensity of ice accretion comprises determining an intensity of ice accretion of a leading edge of a wing.

15. A program product comprising a non-transitory computer readable medium having instructions stored thereon, that when executed by at least one processor, causes the at least one processor to:
receive a plurality of atmospheric particle parameters and at least one vehicle parameter, the plurality of atmospheric particle parameters including a size distribution and water content of an atmosphere around a vehicle, wherein the size distribution includes a size distribution of water particles in a solid form and a liquid form;
determine an intensity of ice accretion corresponding to at least one designated location of the vehicle based on the plurality of atmospheric particle parameters and the at least one vehicle parameter; and
control at least one ice protection element corresponding to the at least one designated location based on the intensity of ice accretion, the at least one ice protection element configured to reduce ice accretion.

16. The program product of claim 15, wherein to determine an intensity of ice accretion comprises to generate an output from a model including the intensity of ice accretion based on an input including the plurality of atmospheric particle parameters and the at least one vehicle parameter.

17. The program product of claim 15, wherein to determine an intensity of ice accretion comprises to generate an output from at least one of a reduced order model, a look-up table, or a computational fluid dynamics model based on an input including the plurality of atmospheric particle parameters and the at least one vehicle parameter.

18. The program product of claim 15, wherein to control the at least one ice protection element comprises to activate the at least one ice protection element when the intensity of ice accretion exceeds a first threshold, and to deactivate the at least one ice protection element when the intensity of ice accretion is below a second threshold.

19. The program product of claim 15, wherein to control the at least one ice protection element comprises to modulate a power level of the at least one ice protection element based on the intensity of ice accretion.

20. The program product of claim 15, wherein to determine an intensity of ice accretion comprises to generate an output based on empirical data input including data acquired from an icing wind tunnel or a test flight.

* * * * *